United States Patent Office 3,157,942
Patented Nov. 24, 1964

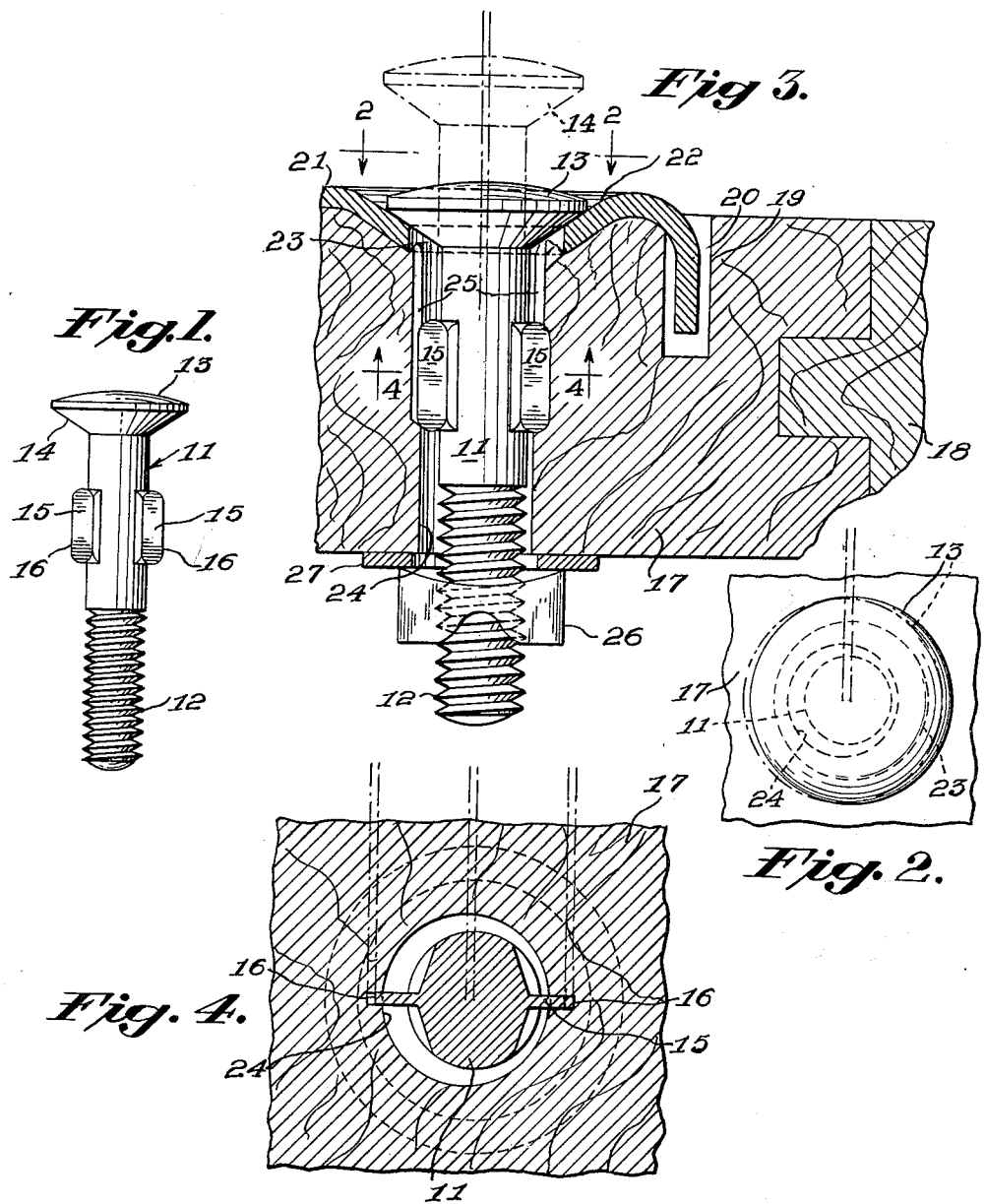

3,157,942
METHOD OF APPLYING SECURING MEANS
John A. MacLean, Jr., Winnetka, Ill., assignor, by mesne assignments, to MacLean-Fogg Lock Nut Co., Chicago, Ill., a corporation of Delaware
Filed Feb. 1, 1960, Ser. No. 5,586
1 Claim. (Cl. 29—432)

My invention relates to a securing means and method of using same and more particularly to finned bolt means to draw down and secure heavy sheet metal members such as railway car floor wear and/or protector plates to wood members such as the floor boards of the car.

This application is a continuation-in-part of my co-pending application Serial No. 495,205, filed March 18, 1955, now abandoned, which latter application was filed as a continuation of my earlier application Serial No. 27,763, filed May 18, 1948, now abandoned.

My invention contemplates and has (for its principal object the art or method of utilizing a bolt having an oppositely finned shank whereby the bolt will always effectively cooperate with superimposed non-aligned but communicating oversize bolt holes in both the heavy sheet metal protector plate and the subjacent floor board, so that the finned shank of the bolt may be readily aligned, inserted and positively driven into and through said bolt holes, so as to receive a nut thereon below the floor board, despite the fact that the oversize bolt hole in the floor board has been drilled noticeably off center with respect to the communicating bolt hole in said protector plate.

My new finned bolt, conformed as it is to function as stated in the immediately preceding paragraph has the additional advantage that it cooperates excellently and positively with at least one side wall of an oversize floor board bolt hole which is drilled through but not axially aligned with the superposed protector plate oversize bolt hole to prevent turning of the bolt in its respective oversize bolt holes while being nutted and throughout the entire movement in said bolt holes until the head thereof is seated with its axis substantially aligned with the center of the hole in the protector plate.

Other objects, features and advantages of my invention will appear from the following description wherein reference is made to the accompanying drawings in which:

FIG. 1 is a side elevational view of my new finned bolt;

FIG. 2 is a top plan view of the assembly shown in partial section in FIG. 3 and illustrating by full and dotted lines how my finned bolt always becomes axially aligned with the oversize bore hole in the heavy sheet metal wear plate and thus seated in the frusto-conical depression (not shown) surrounding said bore hole in the wear plate when the bolt is nutted;

FIG. 3 is an enlarged view partly in section and partly in elevation depicting my new finned bolt assembly as installed and seated in cooperating relationship with an oversize eccentrically bored floor board and countersunk sheet metal floor protector or wear plate;

FIG. 4 is a fragmentary sectional view taken in the plane of line 4—4 of FIG. 3 and looking in the direction indicated by the arrows and also showing the lateral shifting movement of the finned bolt shank within the oversize bolt hole in a direction parallel to the plane of the fins upon concentric seating of the bolt head within the frusto-conical depression in said protector or wear plate.

In the figures illustrated in the drawing similar characters of reference refer to similar parts throughout the several views, and attention is directed to FIGS. 1 to 4 inclusive, wherein my finned bolt, as therein depicted, comprises a generally cylindrical shank 11 that is conventionally threaded at 12 and is provided with a rounded head 13. The under surface of the head 13 is desirably smooth and of frusto-conical configuration as indicated at 14.

Carried by the shank 11 is a pair of diametrically opposite, radially projecting, axially extending fins 15—15. The length of each of these two fins 15—15, is desirably not less than and preferably somewhat greater than the diameter of the shank 11. Neither fin 15 is any thicker at its longitudinal edge 16 than it is where it joins the shank 11. Desirably and preferably each fin 15 is of uniform cross section throughout its entire length. Moreover, each fin 15 is desirably relatively thin, e.g., the fin thickness in a bolt having a shank diameter of ½ inch is approximately .031 of an inch. The longitudinal edges 16—16 of the fins 15—15 are desirably rectilinear and parallel with the bolt axis throughout most of the length of each fin 15. And finally, each fin 15 is spaced from the frusto-conical under surface 14 of the bolt head 13 a substantial distance.

Referring now to FIG. 3, depicting in enlarged section a typical environment in which my finned bolt finds great usefulness, wherein there is illustrated contiguous floor boards 17 and 18 of a railway car, a longitudinal slot 19 is provided in the planar floor board 17 for the reception of the downwardly turned side flange 20 of a floor protector plate 21. The floor protector or wear plate 21 is usually formed of heavy relatively rigid sheet steel and is preformed with a downwardly deflected frusto-conical bolt head seat or depression 22 surrounding the bolt hole 23 which is substantially oversize with respect to the diameter of the bolt shank 11. The diameter of the bolt hole 23 is further somewhat greater than the greatest diametrical distance between the bolt fin edges 16—16. Extending through the floor board 17, as shown in FIG. 3, is a bolt hole 24 which is substantially oversize with respect to the diameter of the bolt shank 11 but has a diameter substantially less than the greatest diametrical distance between the bolt fin edges 16—16. In practice the bolt hole 24 in the wooden floor board 17 is indiscriminately drilled by a workman after the placement of the protector plate 21 upon the planar floor board, by a twist drill passed vertically through the relatively larger protector plate bolt hole 23. Therefore, as the apertured inner end 23, of the preformed truncated depression in the heavy protector plate 21 rests upon the normally flat subjacent board floor 17, which floor has been bored at 24, through the aperture 23, experience has shown that only infrequently is the floor board bolt hole 24 accurately aligned with the much larger protector plate bolt hole 23; usually the two bolt holes are substantially out of axial alignment, as is clearly illustrated in FIGS. 2, 3 and 4. Such usual misalignment of a great many power drilled holes 24 with the vertical axes of associated relatively larger holes 23 in the floor protector plate 21 of a freight car under construction is well understood and recognized in the industry and is thus illustrated in the group of FIGS. 5 to 9 of patent to Tangerman, 2,245,943, of June 17, 1941. Problems such as these have added greatly to construction costs in time and money, where men and extra tools have been required above and below such floors under construction to cooperatively place, hold and apply the many bolts and nuts required and to prevent turning of one with respect to the other during such application as well as during final tightening up wholly from beneath the floor board.

My improved method as herein described and claimed fully overcomes the problems and difficulties noted with consequent savings in expense and labor by introducing my finned bolt into the environment of FIGURES 3 and 4. First the threaded end 12 of the bolt shank 11 is passed through the much enlarged protector plate bolt hole 23 and into the oversize floor board bolt hole 24 until at least one of the fins 15—15, then occupying bolt hole 23, rests upon the top of the floor board 17. Next, by mere observance by the laborer above the bored hole 24, he will then exercise care in the positioning and/or direction of the fins into substantially alignment with the points on the peripheries of the holes 23 and 24 which are closest to each other (see FIG. 2). This position of the fins can be readily ascertained by observation. The bolt shank 11 is then driven, as by striking the bolt head 13, through the bolt hole 24 to expose the threaded lower end 12 of the bolt shank 11 beneath the floor board for nutting. When the belt shank is thus forced through the bolt hole 24, the pair of fins 15, which are considerably wider than the oversize bolt hole 24 will usually form diametrically opposite longitudinal scores 25—25 in the opposite wall of said bolt hole 24 as shown in FIGS. 3 and 4. By reason of their uniform cross section throughout, and the substantial lengths of their longitudinal scoring edges 16—16, the fins 15—15 tend to minimize skewing of the bolt shank 11 with respect to the bolt hole 24, even though the wall portion of the wood scored by one fin 15 happens to be deeper or softer than the wall portion scored by the other fin 15. When the fins 15—15 have scored the wall of the oversize bolt hole 24, and have made substantial entry into the floor board 17, the bolt shank 11 will be effectively held non-rotatable to facilitate the power application of the lock nut 26, of known type, which desirably is preceded by a washer 27. In some instances, the shank 11 of the bolt may extend through a floor clip which is used for securing the floor boards in place or through the flange of a side sill of the car upon which the floor boards rest, but in any instance the remaining structure is essentially as shown in the accompanying drawing. As the nut is drawn tight, due only to such observance and initial positioning of the bolt 11 and its fins 15, as above described and shown in FIGS. 3 and 4 the frustoconical surface 14 on the under face of the bolt head 13 will initially engage high on one side of the frusto-conical depressed head seat 22 of the wear or protector plate 281 as illustrated in dotted lines in FIG. 2, and in the direction of the fins 15 to thereafter cam the bolt shank into approximate axial alignment with the protector plate bolt hole 23 even though the two bolt holes 23 and 24 are substantially misaligned as above explained. When this occurs, the relative thinness and uniform cross section of the two fins 15—15 permits one of them to readily score deeper into the wood wherein it is lodged while the other fin compensatingly partially or even completely recedes from without its respective score, becoming significantly loosened though lodged therein.

Since the diametrical distance between the outer edges 16—16 of the fins 15 is greater than the diameter of the bolt hole or aperture 24 through the thick wooden sub-floor board 17, as clearly illustrated in FIGS. 2, 3 and 4, one or both of the longitudinally extending anchoring fins on opposite sides of the bolt shank 11 will always remain lodged in wood at the sides of the drilled hole or aperture 24, after the bolt is initially inserted and driven therein so that the lower threaded end will protrude below the floor board for a workman therebelow to thread a nut 26 thereon, as above explained.

The bolt 11 is thus always held and secured against turning movement in the oversize bolt hole or aperture 24 through the continuous planar floor boards 17, during the complete power threading of a nut 26 onto the threaded lower end 12 thereof.

However, as stated repeatedly herein the preformed much oversize bolt hole or bore 23 in the metal protector plate 21 and the latter formed or drilled smaller yet oversize bolt hole 24 in the thick wooden sub-flooring are seldom if ever, in axial alignment. Hence, two important improvements were found necessary for the complete power threading of a nut 26 on the threaded shank 12 of the bolt 11 to the final flush seating of the head position 13 of the bolt shank 11 as shown in FIG. 3.

First, as clearly illustrated and repeatedly stated herein the diameter of the rigid sheet metal protector plate bolt hole or bore 23 must be of a diameter to freely permit passage of the outer extremities 16—16 of the bolt fins.

Second, the diameter of the bolt hole or aperture 24 drilled through the sub-wooden floor board 17 must be considerably less than the diametrical distance between the outer extremities 16 of the bolt fins 15. This latter drilled hole 23 must, however, also be of materially greater diameter than the fin carrying bolt body 11 so that said bolt body 11 may shift and move bodily laterally within the drilled hole 24 in the thick wooden sub-flooring relative to the axis of the even larger bore 23 in the metal protector plate thereabove.

And, third, the lateral direction in which the finned bolt body may and/or must finally move within the oversize drilled hole 24 in the sub-floor to assume the head seated position of FIGS. 2 and 3, automatically follows the initial positioning of the bolt 11 in the holes 23 and 24 with the transverse axis of the fins thereon in substantial alignment with the adjacent points on the peripheries of these two holes 23 and 24, as shown, which are noticeably closest to each other. The bolt 11 is then driven to a position where a nut 26 may be started on the threaded lower end 12 thereof and the nut thereafter power rotated on the bolt to draw the bolt down to the shifted and flush head seated position of FIGS. 2 and 3.

Having thus illustrated and described my improved finned bolt and method of securing a preformed and bored sheet metal wear plate to the floor of railway cars and the like therewith, what I claim as new and desire to secure by Letters Patent of the United States is:

In the method of securing a concentrically prebored and countersunk sheet metal protective wear plate in flush surface contact with a planar wood floor of a railway car by a bolt having a finned shank of a diameter materially smaller than said bore in said plate, said shank being threaded at one end and having a head at the other end which head has a smooth frusto-conical surface adjacent the shank and corresponds in contour to the countersink in said wear plate, and said shank having thereon at a position between the threads and the head a pair of diametrically opposed radially projecting fins which extend longitudinally of the bolt shank and whose span radially of the shank is also smaller than the diameter of said bore; the steps which follow the placement of said wear plate in position on the planar wood floor comprising indiscriminately drilling through said countersunk bore in the wear plate and providing an oversize bolt hole through the subjacent wood floor having a diameter smaller than the bore and the radial span of said fins on the bolt shank and materially larger than the diameter of said bolt shank for lateral movement of the bolt shank therein, inserting the threaded end of the bolt shank through said countersunk bore and into said oversize bolt hole in the wood floor, rotatively positioning said bolt to a position in which the radial plane of said fins extends laterally of the peripheries of the said oversize belt hole and countersunk bore at the point on said peripheries at which they approach one another most closely, then driving the finned shank of said bolt into said oversize bolt hole in said rotated position to cause the fins thereof to cut into the wall along the oversize bolt hole in said wood floor, drawing the bolt down tightly against the wear plate to bring the frusto-conical surface of the bolt head into engagement with the countersink in the wear plate to thereby and thereafter force alignment of the axis of the bolt with the axis of the bore in the wear plate by causing the finned bolt shank to correspondingly shift in said oversize bolt hole in the wood floor by one fin cutting deeper into said wall and the other receding in the plane thereof as the bolt is drawn down to final flush seating of its head in said wear plate.

References Cited in the file of this patent
UNITED STATES PATENTS

| | | |
|---|---|---|
| 1,831,813 | Levedahl | Nov. 17, 1931 |
| 1,955,924 | MacLean | Apr. 24, 1934 |
| 1,989,018 | Norwood | Jan. 22, 1935 |
| 2,245,943 | Tangerman | June 17, 1941 |
| 2,313,167 | Nystrom | Mar. 9, 1943 |